United States Patent [19]

Sovilla

[11] 4,338,540
[45] Jul. 6, 1982

[54] INCANDESCENT LAMP

[76] Inventor: Heinz Sovilla, 2, Terrailles, 1304 Cossonay, Switzerland

[21] Appl. No.: 120,859

[22] Filed: Feb. 12, 1980

[30] Foreign Application Priority Data

Feb. 19, 1979 [CH] Switzerland ............... 1590/79
May 12, 1979 [DE] Fed. Rep. of Germany ....... 2919204

[51] Int. Cl.³ ..................... H01J 17/16; H01J 61/40
[52] U.S. Cl. ..................... 313/220; 313/112
[58] Field of Search ............. 313/112, 220, 221, 222

[56] References Cited

U.S. PATENT DOCUMENTS

| | | | |
|---|---|---|---|
| 3,221,198 | 11/1965 | Derwal et al. | 313/112 |
| 3,849,689 | 11/1974 | Campbell | 313/220 |
| 4,006,378 | 2/1977 | Silverstein et al. | 313/112 |
| 4,017,758 | 4/1977 | Raymond | 313/220 |
| 4,080,545 | 3/1978 | Gallo | 313/220 |
| 4,275,327 | 6/1981 | Walsh | 313/112 |

Primary Examiner—Bruce C. Anderson

Attorney, Agent, or Firm—Robert E. Burns; Emmanuel J. Lobato; Bruce L. Adams

[57] ABSTRACT

Incandescent lamp, in particular a halogen lamp, comprising an inner glass bulb that defines and limits an inner small space containing filament means, and at least one outer glass bulb spaced from and surrounding the inner bulb and defining at least one intermediate space. The inner glass bulb is a thick-walled quartz glass bulb that acts as a heat-storage and heat radiation reflecting means and closely surrounds the filament means, so that losses of energy by thermal convection and radiation are strongly reduced leading to an optimum luminous efficiency. For increasing the stability the wall of the inner bulb can be provided with a reinforcement of tungsten wires. Moreover the wall of the inner bulb can be made of foam glass containing inclusions of an infrared radiation absorbing substance as carbon dioxide gas and/or water vapor. The wall of the inner bulb can have openings for balancing the pressure on both sides, or can be surrounded by an intermediate space that is evacuated or filled with an infrared radiation absorbing gas.

6 Claims, 4 Drawing Figures

INCANDESCENT LAMP

The invention relates to an incandescent lamp comprising an inner glass bulb surrounding the filament and an outer glass bulb surrounding the inner bulb with a space between the two bulbs.

A lamp of this type is described in the No. DE-OS 2255480 as a heat dammed incandescence lamp. The inner bulb of this lamp is filled with a rare gas, while the intermediate space between the two bulbs contains only little air or is completely exhausted, so that in this intermediate space only a moderate loss of heat or no loss at all by convection takes place. The temperature inside the inner chamber must however be kept relatively low, for the thin-walled glass bulb is not capable of withstanding a strong temperature increment, more particularly because of the rare gas expansion linked to the temperature increment.

From the review "La Recherche" (No. 97, February 1979, page 198), it is further known to coat the inner wall of a single-chamber incandescent lamp with a reflecting layer, reflecting the infrared radiation but permitting the passage of the visible light.

However, this concept is objectionable in that high heat losses are produced by convection, for the outer wall of the single bulb is in direct contact with the ambient air.

It is an object of the present invention to provide an incandescent lamp having at least two glass bulbs emboxed in each other and whereby an optimal luminous efficiency is attained, by minimizing the losses by convection and radiation.

To this end the lamp according to the invention is characterised in that the inner bulb that can contain a usual mixture of rare gas and nitrogen, is made in the form of a thick-walled heat insulating quartz glass bulb acting as a heat storage and reflection means and surrounding very closely the filament in an internal space.

The decisive advantage of the incandescent lamp according to the invention lies in the fact that the losses of energy by thermal radiation and thermal convection are eliminated to a great extent, for the inner thick-walled glass bulb is capable of withstanding a high internal pressure and absorbs and reflects a substantial portion of the thermal radiation, so that a very high temperature can be maintained within this inner chamber of the inner bulb, thus leading to an optimum luminous efficiency.

In the embodiment of the invention it is further advantageous to connect the inner space of the inner bulb to the intermediate space between the two bulbs through at least one narrow opening, in particular several openings, serving the purpose of compensating pressures, for in this case the temperature and therefore the pressure within the inner chamber can be further increased. With a narrow connecting channel it is possible to achieve a pressure balance without causing the temperature in the intermediate space to attain the temperature of the inner space. It is also possible to provide the lamp with three or more bulbs in order to increase the insulating effect and/or to reduce the pressure differences on both sides of each bulb wall.

The efficiency may be further improved by providing the wall of the inner enclosure with a reinforcement, notably of tungsten wires, or of another material capable of withstanding high temperatures, for in this case the inner bulb material may be raised to a temperature such as to make it pasty, without any risk of collapse, because its stability being assured by the corset-like reinforcement.

It is also possible to increase the efficiency of the lamp according to the invention through one or several of the following steps:

1. Constructing the wall of the inner bulb in a laminate or mica-like form by using at least two transparent substances having a different index of refraction as quartz and/or normal glass or/and air, or forming the wall of quartz glass fibers;

2. Filling one intermediate space outside of the inner glass bulb with an infrared absorbing gas like $CO_2$, $H_2O$ and/or a mixture thereof, or adding particles to the bulb material, which are capable of reflecting and/or absorbing the infrared radiation;

3. The inner glass bulb can be made of foam glass which is known to have very good insulating properties, in particular this foam glass can contain inclusions of a heat radiation absorbing gas as $CO_2$;

4. Coating the inner and/or outer face of the inner bulb with one or several filter layers capable of reflecting the infrared radiation, and 5. Using a special composite filament comprising at least one thick tungsten or similar filament, surrounded by at least one thinner spiral-wound filament.

Another object of this invention is an improved halogen incandescent lamp that can be fabricated much cheaper than conventional halogen lamps.

The attached drawings illustrate by way of example three forms of lamps according to the invention.

Figure 4:
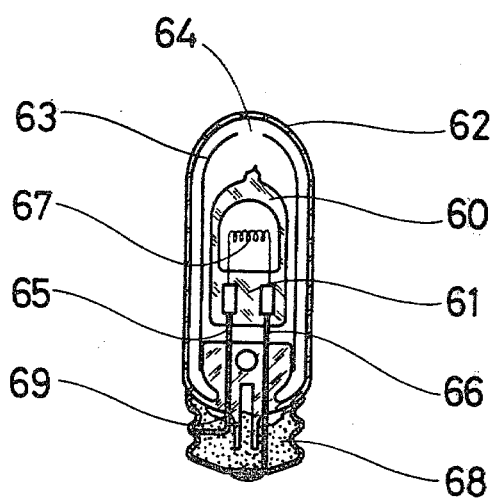

FIG. 4 a third embodiment comprising three glass bulbs.

Figure 1:
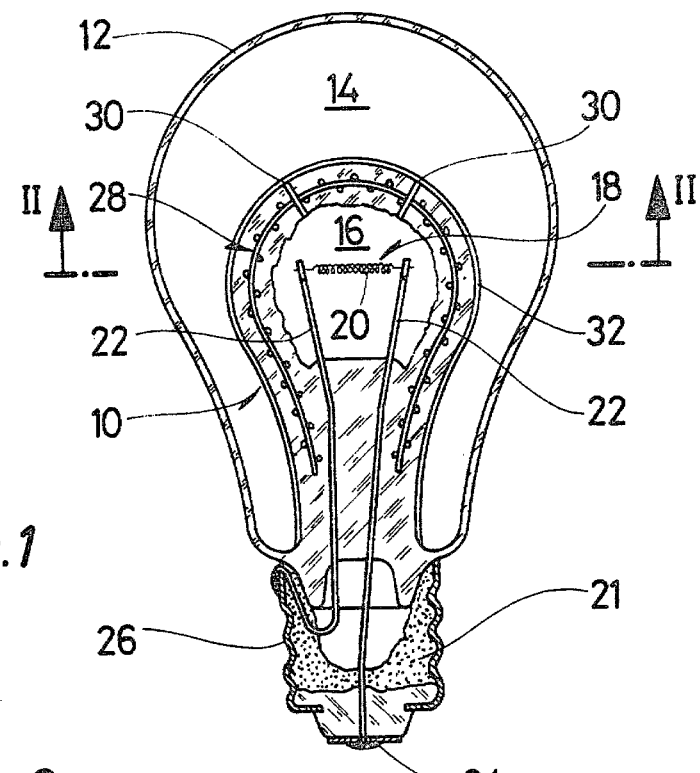
FIG. 1 illustrates an axial sectional view of a first embodiment thereof.
Figure 2:
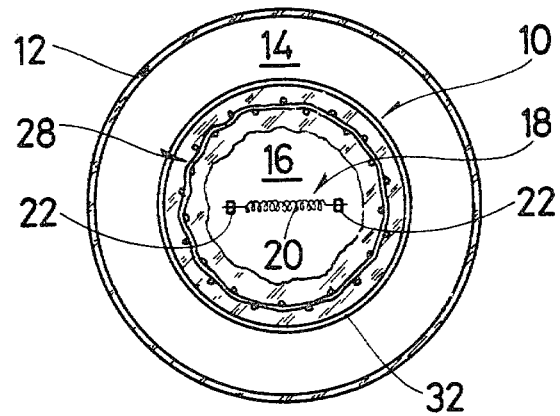
FIG. 2 is a cross section taken along the line II—II of FIG. 1.

The lamp illustrated in FIGS. 1 and 2 has externally the appearance of a normal lamp. However, it departs therefrom in that it contains an inner glass bulb 10 spaced from an external glass bulb 12 so as to form an intermediate space 14. The inner bulb 10 limits a small inner space 16, enclosing a filament arrangement 18 consisting of a spiral-wound filament 20 and its lead-in wires 22 of which one is connected as conventional to a centre contact 24 of the lamp, the other being connected to a screw contact 26. The bulb system which is filled with an usual mixture of rare gas and nitrogen, and the lead-in wires are held in the traditional fashion in the lamp socket 21.

It appears clearly from FIG. 1 that the wall of the inner bulb 10 is very thick and has e.g. a thickness of 4 to 6 mm, so that it serves for storing heat and reflecting the thermal radiation. Since the inner bulb 10 surrounds very closely the filament 20 in a distance of about 3 to 7 mm, it is heated to a considerable degree, so that it is liable under certain circumstances to become distorted. To prevent this distortion, a metal armature or reinforcement 28 is embedded in the wall of the inner bulb 10. This reinforcement may advantageously consist of tungsten wire. Furthermore, the wall of the inner bulb 10 is provided with connecting passages 30, permitting a pressure balance between the inner space 16 and the intermediate space 14, these passages 30 being however so narrow that practically no essential temperature exchange can take place between the gases contained in the inner space 16 and in the intermediate space 14.

The wall of the inner chamber 10 is moreover coated externally with a layer 32 deposited in the fashion of a known glass coating and constituting one or several filter layers, opaque to thermal, respectively infrared radiation, but transparent to the visible light. Finally, the inner surface of the inner bulb 10 is irregular, e.g. corrugated, so that this surface area is increased, with the consequence that the reflection capacity of this surface that forms a boundary surface is increased. Moreover, this inner surface may also be coated with a filter layer reflecting the thermal radiation in order further to increase the lamp efficiency.

From the above description it appears that, in an incandescent lamp according to the invention, substantially all the essential requirements for attaining an optimal luminous efficiency are met simultaneously; the following points requiring a particular attention:

the higher the filament temperature, the better the luminous efficiency;

the thicker and shorter the filament, the longer its useful life;

the lower the amount of gas surrounding the filament, the poorer the filament cooling;

a pressure balance between the inner space and the intermediate space prevents the occurrence of damages due to an overpressure in the inner chamber;

if a gas-containing chamber is divided into two compartments interconnected only by a narrow passage, it is then possible to on the one hand balance the pressure and on the other hand cause the gas contained in the inner chamber to penetrate only to a very reduced extent into the intermediate space, in which it might be cooled;

the amount of heat reflected by the inner bulb towards the filament increases with the temperature of the inner bulb, so that the filament is heated complementary and its luminous efficiency is increased;

glass and quartz glass are poor heat conducting materials, so that a thick-walled inner bulb will provide a good isolation to the inner space;

the inner bulb material may be provided with a reinforcement, advantageously consisting of tungsten wire, but possibly of a ceramic or similar material, to which the glass will adhere even if it is more or less liquid, whereby the capillarity of the armature is important;

the longer the path along which an infrared ray must travel through a medium capable of absorbing the infrared radiation, the weaker this infrared ray;

a composite filament consisting of a relatively long section of thin tungsten filament, surrounding one or a plurality of thick and short tungsten filaments, will be brought to a considerably higher temperature for a same supply current; according to a preferred form of embodiment the composite filament may comprise a thick inner filament (as in low-voltage lamps, for example 6-Volt lamps) surrounded by a thin tungsten filament (similar to those used in 110/220-Volt lamps).

It has been shown that a lamp as described has a higher light efficiency (that means a light flux in lumen units per watt of electrical power) than conventional lamps by at least 150%. So a lamp according to the invention with 10 W or 60 W yields a light efficiency corresponding to that of a conventional lamp having about 25 W and 150 W respectively. Furthermore the temperature of the outer glass bulb was lower by more than 50% and amounted for a 10 W-lamp to only about 50° C. compared with about 120° C. for a conventional 25 W-lamp.

Figure 3:
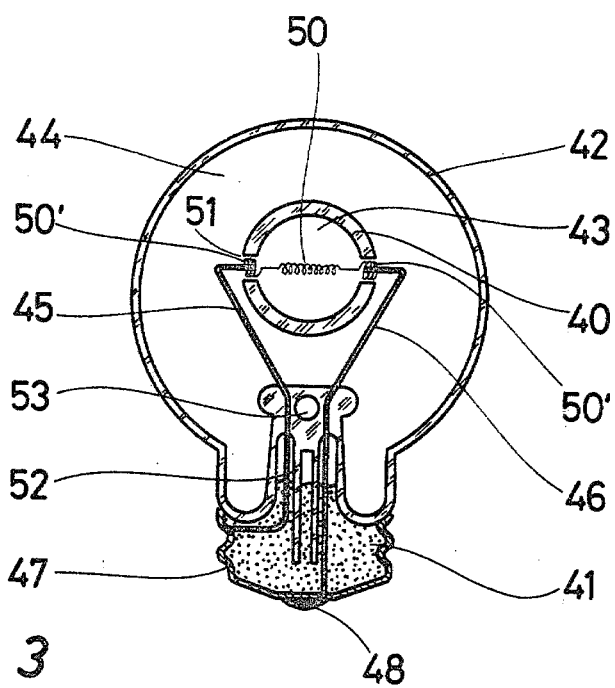
FIG. 3 shows a halogen lamp as second embodiment.

FIG. 3 shows a halogen filled incandescent lamp that comprises an inner prefabricated spherical quartz glass bulb or capsule 40 surrounding the filament 50 in the inner space 43 and having two diametrical opposed small openings 51, and an outer bulb 42 formed of normal or lead glass and fixed on the lamp socket 41. The filament 50 has wounded end parts 50' having a diameter corresponding to the diameter of the openings 51 and traversing the openings 51 in which they are held, thus supporting the filament 50 in a centered position within the inner bulb 40. The leads 45 and 46 connected to the extremities of filament 50 and formed by sufficient rigid wires support the inner bulb 40 and traverse as usual the glass base and the lamp socket 41 where they are connected to the screw contact 47 and the center contact 48 respectively.

The use of a simply prefabricated inner quartz glass capsule, that can have a diameter of e.g. 8–25 mm and a wall thickness of about 1 to 3 mm, and an outer normal glass bulb makes it possible to assemble at first the inner bulb 40 with the filament 50 by simply introducing it through one opening 51 such that it takes its centered position, then to weld the extremities of filament 50 to the leads 45,46 and finally to form the outer normal glass bulb 42 and to join it to the socket 41; these final steps are carried out at melting temperature of normal glass by conventional automatic bulb machines, the inner space 43 and the space 44 between inner and outer bulb connected by the openings 51 are evacuated simultaneously and then filled with the halogen gas mixture through the suction stub 52 and its inner aperture 53, the stub is closed afterwards by welding. In the course of operation the small openings 51 of the inner bulb 40 could eventually become obstructed by the partially melting glass, this has naturally no influence on the good performance of the lamp.

A halogen lamp according to the invention can be fabricated much cheaper than a conventional halogen lamp because there is no necessity to work at high temperatures where quartz glass to be formed is melting. The inner quartz glass bulb which is heated during operation to the high temperature of at least 250° C. necessary for the halogen cycle, makes it possible to create inside an otherwise usual cheap lamp the condition for the halogen lamp function with its high intensity. Until now halogen lamps were used only for special purposes because of their high prices. Since the inner quartz glass capsule according to the invention, which can also have the shape of a small hollow cylinder or another simple shape, can be manufactured very cheaply, a halogen lamp according to the invention does not cost much more than a conventional lamp and therefore offers for the first time the possibility of general use, in particular in the household, whereby lamps with any desired watt number can be fabricated, e.g. with 10 W, 20 W, 60 W, 100 W, 200 W and so on.

Moreover the regular symmetrical shape of the inner quartz glass bulb offers the further advantages to create a good optical configuration for a well defined optimum light distribution and emission, as it is essential for automobile head-lights, and to reflect the heat radiation well to the filament. Conventional halogen lamps with their irregular shape do not show these important characteristics.

The embodiment shown in FIG. 4 is a halogen lamp with three bulbs: An inner quartz glass bulb 60 of about 1.2 to 1.5 mm thickness, hermetically sealed and filled with an usual halogen gas mixture, an intermediate thin-walled glass bulb 63 with a thickness of about 0.5 mm, provided with an opening 64 at its top, and an outer glass bulb 62, which is about 0.5 to 0.7 mm thick and fixed to the lamp socket 68. The inner bulb 60, whose minimum distance from the filament 67 amounts to about 1 to 2 mm, forms essentially the core of an usual halogen lamp; the lead-in wires that are carrying the filament 67 traverse the inner glass base 61 of bulb 60. In order to increase the heat insulation this core is surrounded by the two bulbs 63 and 62 that are evacuated. The respective distance from the intermediate bulb 63 to the inner and the outer bulb respectively is about 0.8 to 1.2 mm. The inner bulb 60 is supported above and spaced from the lamp socket 68 by the rigid lead-in wires 65 and 66, which form as usual the electrical connections to the outer lamp contacts.

During the fabrication the open suction stub 69 serves to produce a high vacuum simultaneously in both bulbs 63 and 62 connected by the opening 64; then the stub 69 is closed by melting.

A 20 W/12 V- halogen lamp according to FIG. 4 yielded a light efficiency which was higher than that of a conventional halogen lamp by about 30 to 50%, and higher than that of a comparable normal incandescent lamp by a factor of 2 to 3. During operation the temperature at the outer face of the inner bulb 60, at the intermediate bulb 63 and the outer bulb 62 were measured to 161° C., 117° C. and only 74° C. respectively. With a better vacuum these values could be further improved.

In the embodiments of FIGS. 3 and 4 the inner bulb could be fixed also on an inner glass support or a small rod as known per se. In a similar manner the inner bulb according to FIG. 1 could be held without direct contact with the lamp socket by an inner support or by rigid lead-in wires.

In the lamp according to FIG. 4 the spaces between the inner bulb 60 and the outer bulb 62 can be filled with an infrared radiation absorbing gas as $CO_2$, $H_2O$ or a mixture of both. Moreover it is also possible to close the intermediate bulb 63 and to fill one of the intermediate spaces between bulbs 60, 63 and 63,62 respectively with such a gas and to evacuate the other.

Principally a lamp according to this invention can comprise more than three shell-like emboxed glass bulbs, whereby at least one of them can have at least one of the additional characteristics explained in relation with FIGS. 1 and 2, and any intermediate space or more intermediate spaces could be evacuated or filled with an infrared radiation absorbing gas. Naturally it must be avoided that gases as $CO_2$ or $H_2O$ can penetrate in the interior of the inner bulb; so the intermediate space surrounding directly the inner bulb must not contain such a gas if this inner bulb comprises openings.

It is also advantageous to make at least one of the bulbs, preferably the inner bulb, of foam glass, either coarsely foamed glass or microscopically fine foamed opal glass; such a foam glass could contain preferably inclusions of an infrared radiation absorbing substance as carbon dioxide gas and/or water vapor.

The material of at least one of the bulbs can contain also substances or particles capable of absorbing and/or reflecting the infrared radiation.

The results of using two, three or more bulbs are not only a better heat insulation as described, but also a diminuation of the pressure and temperature differences on both sides of the corresponding bulb wall, depending on the amount of converted energy. Moreover, in order to meet always the optimum operation conditions, each intermediate space between bulbs can be evacuated or filled with gas.

In general the wall thickness of the inner bulb should be at least about 1 mm and can reach about 6 mm or, in special cases, even more. The distance between the filament means and the inner bulb should be as small as possible and can in general have values between about 1 mm (in small halogen lamps) and about 10 mm, depending on the lamp size and power, on the material, structure and thickness of the inner bulb, on the gas filling and on the admissible or desired heating temperature. In any case the wall thickness of the inner bulb and its distance from the filament must meet the condition that at the high glass temperatures prevailing at the inner face of the inner bulb, the mechanical stability of the bulb material will be retained and that there is not yet any practical evaporation of this material.

Each lamp according to this invention can be operated as a halogen lamp provided that the temperature on the inner face of the inner bulb attains the minimum temperature necessary for the halogen cycle.

Regarding its shape the lamp according to the invention is not limited to the embodiments as shown but can have any other shape, in particular the modern shape of known halogen lamps.

What is claimed is:

1. An incandescent lamp comprising an inner glass bulb defining and limiting an inner small space containing filament means, an intermediate glass bulb spaced from and surrounding the inner bulb and defining a first intermediate space and an outer glass bulb spaced from and surrounding said intermediate glass bulb and defining a second intermediate space, said inner glass bulb being a hermetically sealed thick-walled quartz glass bulb acting as heat storage and heat radiation reflecting means and closely surrounding said filament means and said intermediate and outer glass bulbs being of thinner glass, at least one of said intermediate spaces being under high vacuum.

2. An incandescent lamp according to claim 1, in which said second intermediate space is in communication with said first intermediate space through a small passage to provide equalization of pressure in said spaces.

3. An incandescent lamp according to claim 1, in which one of said intermediate spaces contains a gas capable of absorbing heat radiation while the other of said spaces is evacuated.

4. An incandescent lamp according to claim 1, in which said inner bulb is filled with a halogen gas mixture.

5. An incandescent lamp according to claim 1, in which said inner bulb is supported by lead-in wires for said filament means.

6. An incandescent lamp according to claim 1, in which said inner bulb is of foamed quartz glass.

* * * * *